(12) United States Patent
Gonsalves et al.

(10) Patent No.: US 7,366,284 B2
(45) Date of Patent: Apr. 29, 2008

(54) OUTAGE REPORTING FOR A TELECOMMUNICATIONS SYSTEM

(75) Inventors: Brian Gonsalves, Antioch, CA (US); Sherri D. Pena, Martinez, CA (US)

(73) Assignee: SBC Properties, L.P., Reno, NV (US)

( * ) Notice: Subject to any disclaimer, the term of this patent is extended or adjusted under 35 U.S.C. 154(b) by 420 days.

(21) Appl. No.: 11/122,321

(22) Filed: May 4, 2005

(65) Prior Publication Data

US 2005/0259573 A1 Nov. 24, 2005

Related U.S. Application Data

(63) Continuation of application No. 10/289,465, filed on Nov. 6, 2002, now Pat. No. 6,928,147.

(51) Int. Cl.
*H04M 1/24* (2006.01)
*H04M 3/08* (2006.01)
*H04M 3/22* (2006.01)

(52) U.S. Cl. .............. 379/32.01; 379/1.01; 379/9.03; 379/9.04; 379/14.01; 379/26.01

(58) Field of Classification Search .............. 379/1.01, 379/9, 9.02–4, 9.06, 12, 14.01, 15.01, 15.05, 379/22, 22.04, 26.01, 32.01, 32.04
See application file for complete search history.

(56) References Cited

U.S. PATENT DOCUMENTS

| | | |
|---|---|---|
| 4,768,222 A | 8/1988 | Kalfon |
| 5,063,523 A | 11/1991 | Vrenjak |
| 5,426,421 A | 6/1995 | Gray |
| 5,508,941 A | 4/1996 | Leplingard et al. |
| 5,553,059 A | 9/1996 | Emerson |
| 5,661,778 A | 8/1997 | Hall et al. |
| 5,696,486 A | 12/1997 | Poliquin et al. |
| 5,802,144 A | 9/1998 | Laird et al. |
| 5,946,373 A | 8/1999 | Harris |
| 5,949,779 A | 9/1999 | Mostafa et al. |
| 6,058,355 A | 5/2000 | Ahmed et al. |
| 6,067,030 A | 5/2000 | Burnett et al. |
| 6,137,868 A | 10/2000 | Leach |
| 6,150,955 A | 11/2000 | Tracy et al. |
| 6,181,677 B1 | 1/2001 | Valli et al. |
| 6,363,422 B1 | 3/2002 | Hunter et al. |
| 6,556,659 B1 | 4/2003 | Bowman-Amuah |
| 6,647,117 B1 | 11/2003 | Wallace et al. |

*Primary Examiner*—Binh K. Tieu
(74) *Attorney, Agent, or Firm*—Brinks Hofer Gilson & Lione

(57) ABSTRACT

An outage reporting method and system are disclosed for a telecommunications system. The outage reporting system includes a processor to record a data element value. The data element value indicates a type of outage that occurred in the telecommunications system, such as an administrative or network outage. The data element value can be sent to a network management system for use by the telecommunications provider, for example, to determine whether or not the telecommunications user should receive a refund.

15 Claims, 2 Drawing Sheets

OUTAGE REPORTING FOR A TELECOMMUNICATIONS SYSTEM

CROSS REFERENCE TO RELATED APPLICATION

The present application is a continuation of U.S. application Ser. No. 10/289,465, filed Nov. 6, 2002 now U.S. Pat. No. 6,928,147, the entire disclosure of which is incorporated by reference into herein.

FIELD OF THE INVENTION

The invention relates to a system and method for reporting telecommunication outages to a user.

BACKGROUND

Advances in telecommunications systems have provided more services to telecommunications users. Agreements are typically established between a telecommunication provider and the telecommunications user to define the services. Such agreements can be referred to as service level agreements (SLA). One such service level agreement may offer refunds to the customer for network outages, but not for administrative outages. An administrative outage occurs due to local power outages and outages when the customer disconnects their telecommunications equipment or power.

Known solutions to track administrative outages rely on complex and expensive backend equipment and trouble tickets. Trouble tickets allow telecommunication users to call the telecommunication provider to report a power outage or other outage. Trouble tickets rely upon the user to report such outages, however, and thus can be unreliable. Therefore, there is a need for a system that can inform the telecommunications provider of the type of outage that occurred, without having to rely upon the telecommunication user.

TABLE OF ACRONYMS

The following table aids the reader in determining the meaning of the several acronyms used to describe the embodiments:

CPE=customer premise equipment.
DSU/CSU=digital service unit/channel service unit.
LAN=local area networks.
LMI=local management interface.
NMS=network management system.
PVC=permanent virtual circuit.
SLA=service level agreement.
WAN=wide area network.

DETAILED DESCRIPTION

A telephone service outage reporting system is provided to a telecommunication system. The reporting system reports whether a telephone outage was a telecommunications provider's network outage or another type of outage, such as an administrative outage. An administrative outage includes local power outages and outages when the customer disconnects their telecommunications equipment or power.

Figure 1:
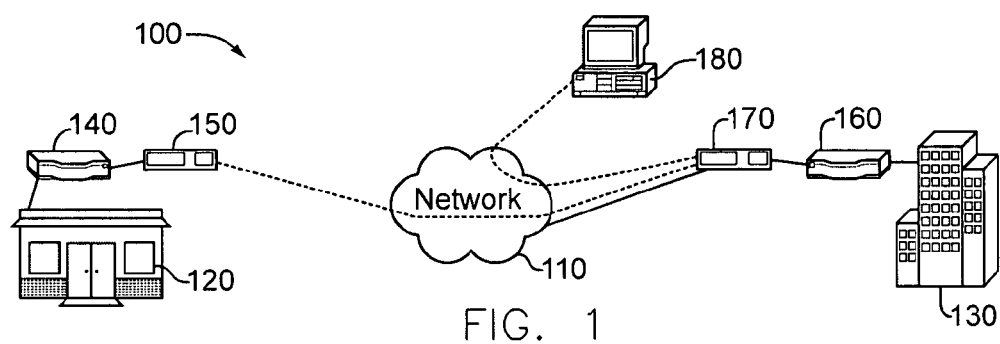
FIG. 1 is a diagram illustrating an exemplary reporting system for reporting telecommunication network and administrative outages.

FIG. 1 is a diagram illustrating an exemplary reporting system 100 for reporting telecommunication network and administrative outages. The solid lines show physical links, such as wire line and wireless connections, and the dashed lines show data flow. The reporting system 100 includes a communications network 110. The communications network 110 includes the Internet and other types of networks, such as local area networks (LANs), other wide area networks (WANs), and regional networks accessed over telephone lines, switches and routers, and via wireless communications.

A first telecommunications user 120 and a second telecommunications user 130 connect to the communications network 110. Any number of other telecommunications users, not shown, can also connect to the communications network 110. A first router 140 and a first processor, such as a digital service unit/channel service unit (DSU/CSU) 150, can be connected between the first telecommunications user 120 and the communications network 110. The DSU/CSU provides data element signals regarding administrative and network outages. A second router 160 and a second processor, such as a DSU/CSU 170, can be connected between the second telecommunications user 130 and the communications network 110. The DSU/CSU can be a standalone device or one that is embedded within the router 140, 160. If the DSU/CSU is embedded within the router 140, 160, the router provides the data element signals regarding administrative and network outages.

A network management system (NMS) or report collector 180 connects to the network 110 to obtain the data element signals from the DSU/CSU 150, 170. The DSU/CSUs 150, 170 include applications, such as with software, hardware or firmware, to record and analyze the types of outages that occur on the telecommunication network 100. In one aspect, customer premise equipment (CPE) access devices provide can data that differentiates an administrative outage from a network or other outage. The administrative outage includes outages that occur outside of the network, such as at the CPE. The DSU/CSUs 150, 170 may be programmed to send a data element indicating an administrative outage, for example, upon power-on and/or power-off of the DSU/CSUs 150, 170.

The DSU/CSUs 150, 170 can send the data element signals to the NMS 180 of the telecommunication provider or another NMS, such as an NMS of the telecommunications users 120, 130, to report the types of outages that occurred. For example, the data element signal may include a value of 0 if no outages have occurred, a value of 1 if a network outage has occurred and a value of 2 if an administrative outage has occurred.

Moreover, the NMS 180 can also query the DSU/CSU 150, 170 to acquire information about the types of outages that occurred. The telecommunication provider can use the information from the DSU/CSU 150, 170 to help evaluate whether a refund is due to the telecommunications user or not, for example, if the telecommunications user is qualified for a refund in accordance with a service level agreement (SLA).

An administrative outage can result from software outages, hardware outages, and the like. A device, such as a telephone of the telecommunication user 120, 130 can be disabled through software, e.g., administrative work conducted on the device, so the software has been disabled. Moreover, the software can be defective. The telecommunication device can also become disabled through power outages, e.g., the device can be unplugged from the power supply or a general power outage such as a blackout could have occurred. Moreover, hardware components could have failed or become defective. Likewise, a catastrophic event could have occurred, such as an earthquake, a hurricane, a flood and the like.

Using data element signals or the like, the reporting system 100 can distinguish between an outage that has occurred as a result of the service being disabled through hardware or software and an outage where the user's device is operating correctly, but communication into the network has failed due to a network outage. According to one type of SLA, the telecommunications provider may offer refunds to the telecommunication user 120, 130, or other customers, for network outages, but not for the administrative outages.

Figure 2:
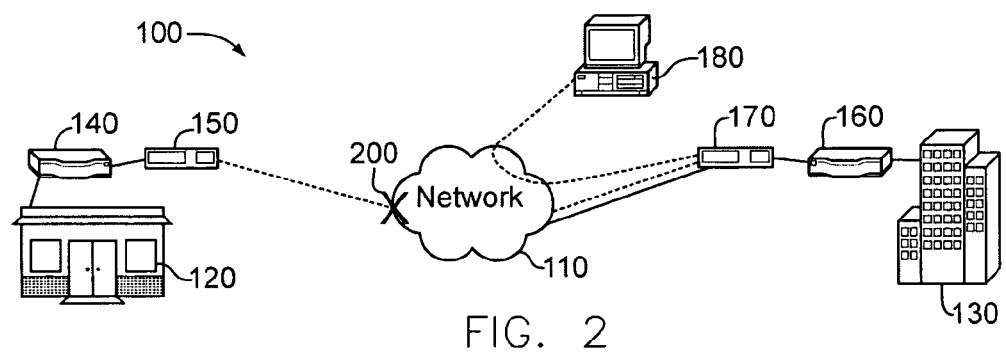
FIG. 2 is a diagram illustrating the reporting system in which a network outage has occurred.

FIG. 2 is a diagram illustrating the reporting system 100 in which a network outage has occurred. When an outage 200 occurs at the network, the DSU/CSU analyzes the outage and records a data element value to indicate the network outage. For example, when a network outage occurs at the network connection from the first telecommunications user 120 to the communications network 110, the DSU/CSU 150 records the data element value, e.g., the value 1. When the network connection is restored, the DSU/CSU 150 sends a data element signal to the NMS 180 which represents the data element value for a network outage.

To determine that a network failure occurred, the DSU/CSUs 150, 170 may periodically query the network 110 to determine if a connection can be accomplished. The DSU/CSUs 150, 170 may also randomly query the network 110. The querying can occur when initiated by an operator, or can occur automatically ever 1 second, 5 seconds, 30 seconds, 30 minutes, etcetera, and preferably occurs every 15 seconds. The result of the query can be contained in a permanent virtual circuit (PVC) status field of a protocol message, such as a local management interface (LMI) message. The DSU/CSUs 150, 170 can use the PVC status from the LMI messages to determine when network outages begin and end. The DSC/CSUs 150, 170 are programmed to send a determined data element corresponding to the PVC statuses.

Figure 3:
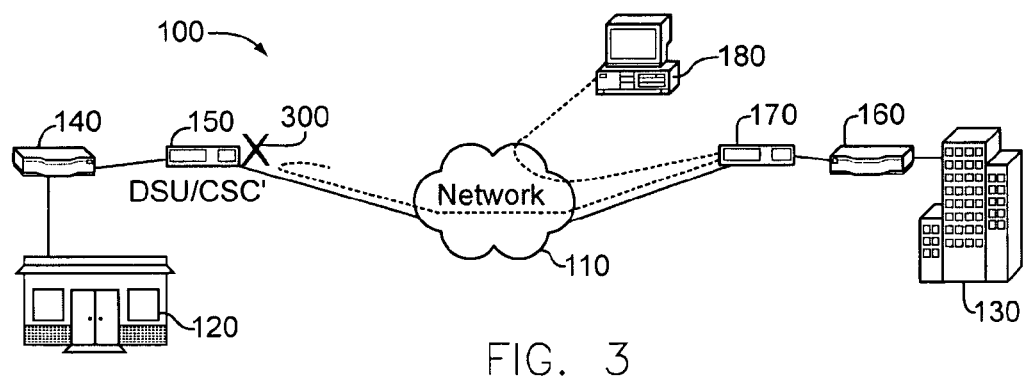
FIG. 3 is a diagram illustrating the reporting system in which an administrative outage has occurred.

FIG. 3 is a diagram illustrating the reporting system 100 in which an administrative outage has occurred. When a non-network outage occurs, for example, an administrative outage occurs with the first telecommunication user 120, the DSU/CSU 150 analyzes and records a data element value. For example, when an administrative outage occurs at the first telecommunications user 120, the DSU/CSU 150 records a data element value, e.g., the value 3. The outage could be the result of hardware or software failure, disconnection or disabling, or a power outage at the first telecommunication user 120. When the DSU/CSU 150 is enabled, the DSU/CSU can send to the NMS 180 a signal representing the data element value. The data element value indicates that an administrative outage has occurred.

Figure 4:
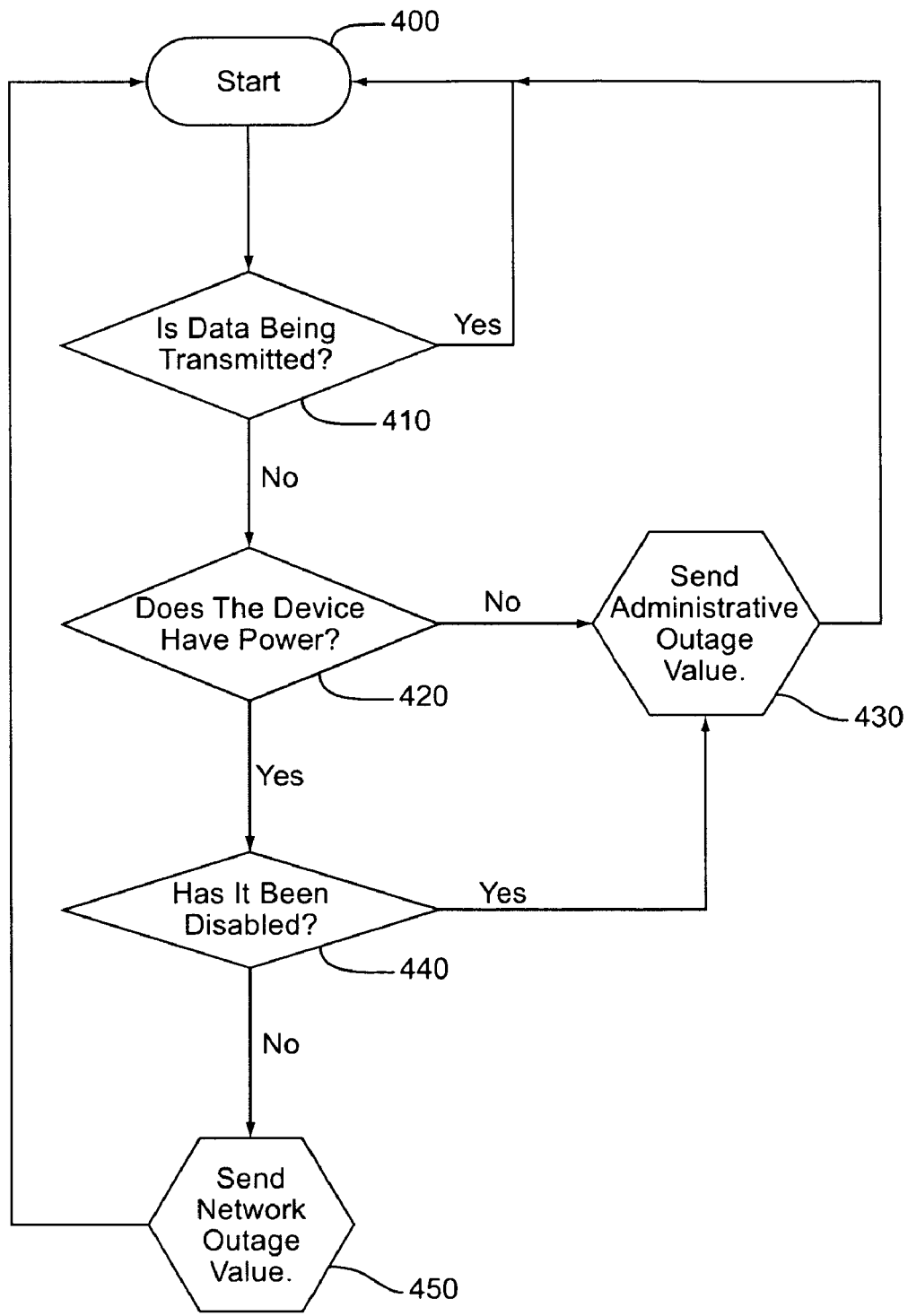
FIG. 4 is a flowchart illustrating a methodology for determining a type of telecommunications outage that has occurred.

FIG. 4 is a flowchart illustrating a methodology for determining a type of telecommunications outage that has occurred. The methodology can be accomplished with software, hardware, firmware, or any combination thereof. The methodology can be handled by the DSU/SCU 150, 170, by the router 140, 160 with DSU/CSU capabilities, or the like.

The methodology begins at block 400. At block 410, the DSU/CSU 150, 170 determines whether data is being transmitted. The determination can be made continuously, periodically or at other determined times. If data is being transmitted, a value that indicates no outage can be transmitted to the NMS 180.

At block 420, if the DSU/CSU 150, 170 determines that data can be transmitted, the methodology determines whether the DSU/CSU is being powered. At block 430, if the DSU/CSU 150, 170 is not being powered, when power returns the DSU/CSU 150, 170 can send to the NMS 180 a data element value that indicates that an administrative outage has occurred. At block 440, the DSU/CSU 150, 170 determines whether software or hardware has been disabled, such as by reporting the DSU/CSU 150, 170 being powered on and powered off. At block 430, if software or hardware has been disabled, the DSU/CSU 150, 170 sends a data element value that indicates that an administrative outage has occurred. At block 450, if the DSU/CSU 150, 170 has power, software and hardware have not been disabled, and data is not being transmitted, the DSU/CSU 150, 170 can send a data element value indicating that a network outage has occurred.

While the invention has been described above by reference to various embodiments, it will be understood that many changes and modifications can be made without departing from the scope of the invention. It is therefore intended that the foregoing detailed description be understood as an illustration of the presently preferred embodiments of the invention, and not as a definition of the invention. It is only the following claims, including all equivalents, which are intended to define the scope of this invention.

We claim:

1. An outage reporting system for a telecommunications system, the outage reporting system comprising:
   a processor to record a data element value, wherein the data element value indicates a type of outage that occurred in the telecommunications system;
   wherein the processor determines whether data is being transmitted in the telecommunications system;
   wherein if data is not being transmitted in the telecommunications system, the processor further determines whether a digital service unit/channel service unit is disabled and whether the digital service unit/channel service unit is receiving power; and
   wherein if the digital service unit/channel service unit has been disabled but is still receiving power, the processor records a data element value that indicates an administrative outage.

2. The outage reporting system of claim 1, wherein the type of outage includes at least one of an administrative outage and a network outage.

3. The outage reporting system of claim 2 wherein the administrative outage comprises at least one of a hardware outage and a software outage.

4. The outage reporting system of claim 1 further including a network management system connected with the processor.

5. The outage reporting system of claim 4 wherein the network management system receives the data element value.

6. The outage reporting system of claim 5 wherein the data element value is used to determine whether a telecommunications user is qualified for a refund.

7. The outage reporting system of claim 1 wherein the processor comprises a digital service unit/channel service unit.

8. A method for determining outages in a telecommunications system, the method comprising:
- determining a data element value, wherein the data element value indicates a type of outage that occurred in the telecommunications system;
- wherein determining the data element value further comprises determining whether data is being transmitted in the telecommunications system;
- wherein if data is not being transmitted in the telecommunications system, further determining whether a digital service unit/channel service unit is disabled and whether the digital service unit/channel service unit is receiving power; and
- wherein if the digital service unit/channel service unit has been disabled but is receiving power, recording a data element value that indicates an administrative outage.

9. The method of claim 8 wherein the type of outage includes at least one of an administrative outage and a network outage.

10. The method of claim 9 wherein the administrative outage comprises at least one of a hardware outage and a software outage.

11. The method of claim 8 further including receiving the data element value at a network management system.

12. The method of claim 11 further comprising using the data element value is used to determine whether a telecommunications user is qualified for a refund.

13. The method of claim 8 wherein the data element value is determined by a digital service unit/channel service unit.

14. The method of claim 8 wherein if the digital service unit/channel service unit is not receiving power, recording a data element value that indicates an administrative outage.

15. The method of claim 8 wherein if data is not being transmitted in the telecommunications system, the digital service unit/channel service unit is receiving power, and the digital service unit/channel service unit is not disabled, recording a data element value that indicates a network outage.

* * * * *